No. 851,393. PATENTED APR. 23, 1907.
G. W. BELL.
PNEUMATIC WHEEL SUPPORT.
APPLICATION FILED JAN. 31, 1906.

2 SHEETS—SHEET 1.

WITNESSES.
Thos. D. Longstaff
J. M. Ashowalter

INVENTOR.
George William Bell.
By Barthel & Barthel
Attorneys.

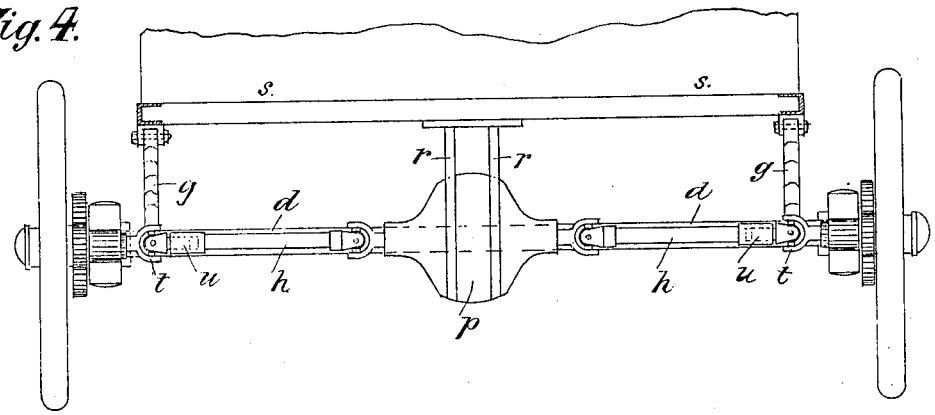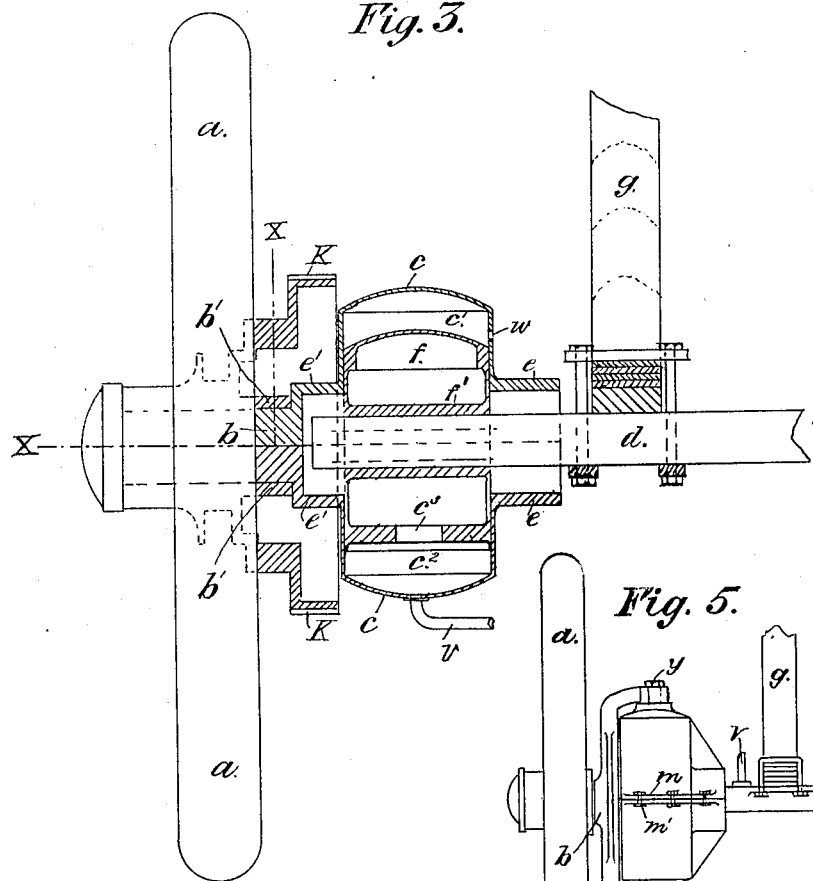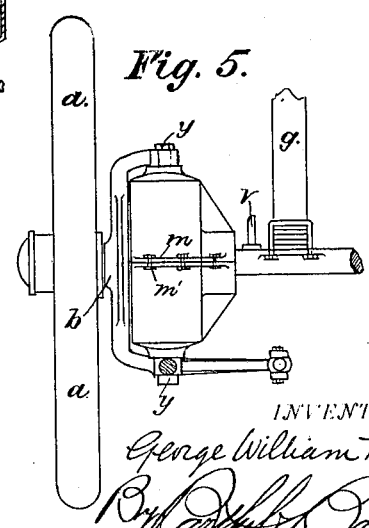

UNITED STATES PATENT OFFICE.

GEORGE WILLIAM BELL, OF LIVERPOOL, ENGLAND.

PNEUMATIC WHEEL-SUPPORT.

No. 851,393.   Specification of Letters Patent.   Patented April 23, 1907.

Application filed January 31, 1906. Serial No. 298,759.

*To all whom it may concern:*

Be it known that I, GEORGE WILLIAM BELL, a subject of the King of Great Britain and Ireland, residing at Liverpool, in the county of Lancaster, England, have invented certain new and useful Improvements in Pneumatic Wheel-Supports, of which the following is a specification, reference being had therein to the accompanying drawings.

This invention relates more particularly to a pneumatic cushioning wheel support for power driven vehicles and the object of the invention is to provide an efficient substitute of simple construction for the pneumatic tired wheel.

Figure 2:
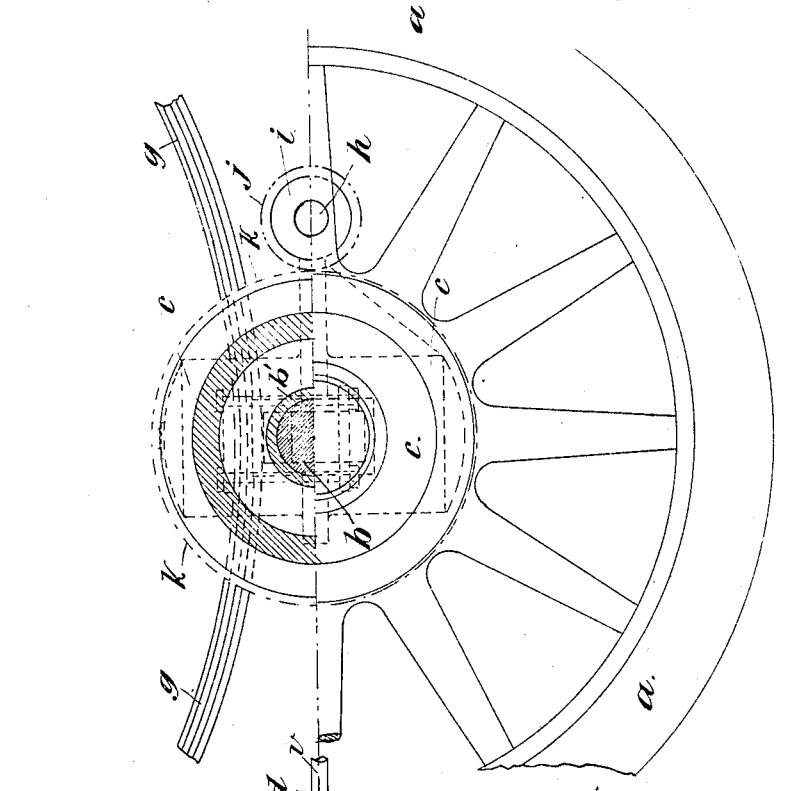
Figure 1:
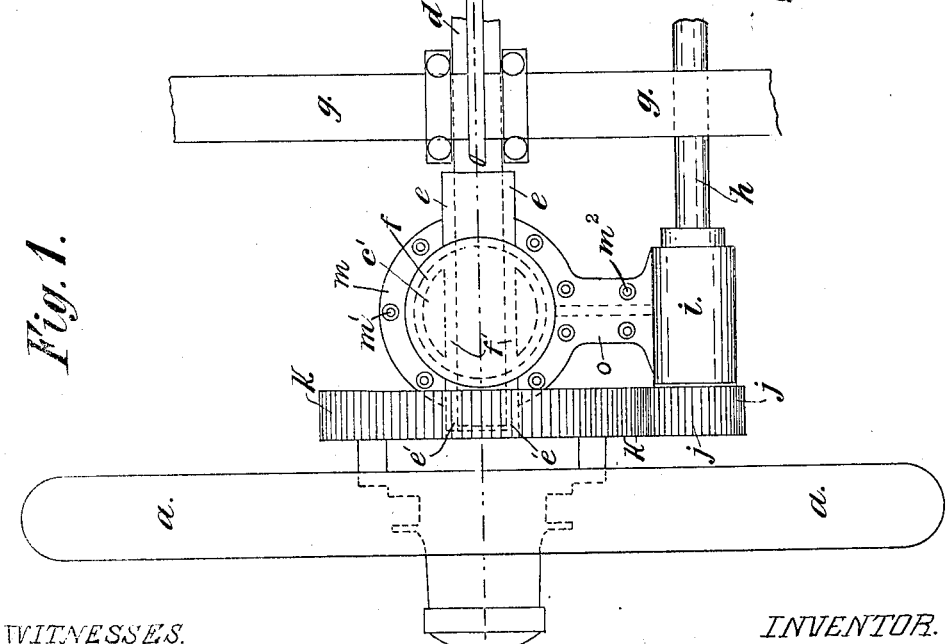

To this end my invention consists in the novel construction, arrangement and operation of a pneumatic cushioning device which interposes an air spring between the wheels and the ends of axles supporting the body and all the other parts of the vehicle in the manner as more fully hereinafter described and shown in the accompanying drawings, in which Figure 1, is a plan view of the device; Fig. 2, is a sectional elevation, the sectional portion being in the vertical plane of line $x$—$x$ Fig. 3; Fig. 3, is a sectional elevation at right angles to Fig. 2, the sectional portion being in the vertical plane of the axis of the wheel. Fig. 4, is a diagram elevation showing my improvement as applied to the rear axle of an automobile; Fig. 5, is an elevation showing my construction as applied to the front axle.

$s$ represents the body of the automobile, $d$ a rigid axle which in this instance is the rear axle and $g$ are spring interposed between the body and the axle $d$, the springs being rigidly bolted upon the axle as in the usual manner. The axle $d$ extends outwardly beyond the springs and to these outwardly extending ends my improved wheel supports are applied in the following manner.

$c$ is a vertical cylinder closed at both ends and $f$ is a hollow piston working in the cylinder and forming therein two air chambers $c'$ $c^2$, one above and one below the piston, the latter being in communication with the interior of the piston through an aperture $c^3$ in the lower end of the piston.

The piston $f$ is vertically secured in fixed position upon the axle by having an aperture surrounded by a wall $f'$ formed through it, the axle being made rectangular and fitting the aperture in the piston and suitable fastening means holding it against endwise displacement.

The cylinder is made in two halves divided upon a central horizontal plane each half being cast with a flange $m$ through which bolts $m'$ pass to secure the halves together. The cylinder is formed with enlarged openings for the axle $d$ to pass through and around these openings are formed the vertical guide boxes $e$ $e'$ in which the axle $d$ has a free vertical play; as shown the guide boxes $e$ $e'$ are formed in halves integrally with the halves of the cylinder.

The outer guide box $e'$ is formed or provided with a prolongation $b$ which constitutes a stub axle upon which the supporting wheel is journaled in the usual manner; as shown the stub axle $b$ is formed in halves integrally with the halves of the cylinder and the wheel $a$ is provided with a hub box $b'$ which forms the bearing of the wheel.

The supporting wheel has secured to it in any suitable manner concentric with the hub box a gear wheel K to which power is transmitted by a pinion $j$. This pinion is secured to a spindle $h$ which is supported in a bearing $i$ formed on the end of a bracket $o$ carried by the cylinder; as shown the bracket is cast in halves integrally with the halves of the cylinder, the halves being secured together by bolts $m^2$.

The spindle $h$ extends transversely in front of the axle $d$ and its inner end is in power transmitting connection with the usual compensating drive gear or other suitable power transmitting gear (not shown) contained within an outer casing $p$ and rigidly supported by means of suitable hangers $r$ from the body $s$. The spindle $h$ is made flexible as by means of suitable universal joints $t$ $t$ and is also provided with a slip joint $u$.

The parts being constructed and arranged to operate as shown and described it will be seen that the device forms a pneumatic cushioning wheel support by charging the chamber $c^2$ of the cylinder with air of sufficient pressure to sustain the axle with its load upon the air cushion formed thereby. To this end a pipe $v$ leads into this air chamber and supplies the same with compressed air from a suitable pump or reservoir operated by the motive power of the vehicle, a suitable means being provided for increasing or diminishing the pressure of air as may be required under varying conditions, all of which is well understood and forms no part of this invention.

The air in the chamber $c'$ above the piston forms a check spring for the air cushion below, it is provided with a restricted port $w$ through which the air can pass in or out under the control of the piston as it rises and falls in the cylinder.

In Fig. 5 my pneumatic cushioning device is shown as applied to the front axle. Instead of making the stub-shaft $b$ rigid with the cylinder, it is formed with a yoke and turns on trunnions $y$ formed on the opposite ends of the cylinder, the additional space which this yoke requires is obtained by omitting the guide box $e'$ thus making the distance between the front wheels $a$ the same as between the rear wheels. The air pipe $v$ in this case may be connected to the axle and a hole drilled into the axle to form a passage for the air into the air chamber in the cylinder.

The piston will be suitably constructed to move as air tight as possible in the cylinder and to reduce its friction to a minimum I intend to apply an efficient system of lubrication thereto, all of which will be readily understood.

My construction has the advantage of simplicity and forms an efficient substitute for the pneumatic tired wheel without involving any radical departures from the construction of pneumatic tired wheels.

What I claim as my invention is:—

1. The combination with the vehicle body, of an axle upon which said body is mounted upon springs intermediate between the ends of the axle, and pneumatic cushioning wheel supports on the opposite ends of the axle, each comprising a hollow piston rigidly mounted upon the end of the axle and extending vertically above and below the same, a cylinder inclosing the piston and forming air chambers above and below the piston, a stub-axle rigidly connected to the cylinder and forming an independent extension of the axle, a supporting wheel journaled upon the stub-axle and means for supplying the air chamber in the lower end of the cylinder with compressed air, said cylinder being horizontally divided in halves bolted together and provided with flanged openings adapted to vertically guide the cylinder upon the axle.

2. The combination with a vehicle body, of an axle upon which said body is yieldingly supported intermediate between its ends, pistons carried at opposite ends of the axle and extending vertically above and below the same, a cylinder inclosing each piston and forming air chambers above and below said pistons, means for supplying the air chambers below the pistons with compressed air, a stub-axle rigidly carried by each cylinder and forming an independent extension of the axle, a supporting wheel journaled upon each stub axle and actuating drive connection comprising a transmitting gear centrally suspended from the vehicle body, flexible spindles extending laterally therefrom and provided with drive pinions at their outer ends and a gear wheel carried by each supporting wheel engaging with said drive pinions, the outer ends of the flexible spindles being supported in bearings carried by the cylinders.

3. The combination with a vehicle body, of an axle upon which said body is yieldingly supported intermediate between its ends, stub-axles adjacent to the outer ends of this axle and forming complementary extensions thereof, supporting wheels journaled upon said stub-axles and a piston and cylinder connected respectively to the adjacent ends of the axle and stub-axles and carried by the same in vertically sliding engagement with each other, the cylinders inclosing the pistons and forming air chambers above and below the pistons and means for supplying the air chambers which support the axle with compressed air.

In testimony whereof I affix my signature in presence of two witnesses.

GEORGE WILLIAM BELL.

Witnesses:
   OTTO F. BARTHEL,
   THOS. B. LONGSTAFF.